United States Patent
Aota et al.

(10) Patent No.: US 8,285,088 B2
(45) Date of Patent: Oct. 9, 2012

(54) WAVELENGTH SELECTIVE SWITCH

(75) Inventors: Hirofumi Aota, Kawasaki (JP); Kohei Shibata, Kawasaki (JP); Tsuyoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1030 days.

(21) Appl. No.: 12/068,351

(22) Filed: Feb. 5, 2008

(65) Prior Publication Data
US 2008/0239444 A1    Oct. 2, 2008

(30) Foreign Application Priority Data

Mar. 29, 2007   (JP) ................................ 2007-087605

(51) Int. Cl.
*G02B 6/12* (2006.01)
*G02B 6/34* (2006.01)
*G02B 7/02* (2006.01)

(52) U.S. Cl. .............. 385/16; 385/18; 385/37; 359/820; 398/84

(58) Field of Classification Search .................. 359/566, 359/820; 385/24, 37, 16, 18; 398/84, 79, 398/83, 86, 87
See application file for complete search history.

(56) References Cited

U.S. PATENT DOCUMENTS

| | | | | |
|---|---|---|---|---|
| 6,343,866 B1 * | 2/2002 | Cao et al. | ....................... | 359/868 |
| 6,545,826 B2 * | 4/2003 | Horwitz et al. | ............... | 359/820 |
| 6,580,856 B1 * | 6/2003 | Wade | .............................. | 385/37 |
| 6,731,838 B1 * | 5/2004 | Dueck et al. | ................... | 385/37 |
| 7,177,496 B1 * | 2/2007 | Polynkin et al. | ............... | 385/24 |
| 7,822,303 B2 * | 10/2010 | Cohen et al. | ................... | 385/18 |
| 7,899,330 B2 * | 3/2011 | Ye et al. | ......................... | 398/85 |
| 2005/0213978 A1 | 9/2005 | Yamashita et al. | | |

OTHER PUBLICATIONS

Patent Abstract of Japan, Japanese Publication No. 2006-171930, Published Jun. 29, 2006. (1 page).
Patent Abstract of Japan, Japanese Publication No. 2003-248179, Published Sep. 5, 2003. (1 page).

* cited by examiner

*Primary Examiner* — Audrey Y Chang
(74) *Attorney, Agent, or Firm* — Staas & Halsey LLP

(57) ABSTRACT

A wavelength selective switch for suppressing degradation of pass band characteristics when the temperature rises. The wavelength selective switch includes a spectroscopic element for separating input light and providing angular dispersion depending on wavelengths, a collective lens for gathering light output from the spectroscopic element, and a movable reflection block which includes a plurality of mirrors arranged in the direction of angular dispersion made by the spectroscopic element, changes the angles of the mirrors in a direction differing from the direction of angular dispersion, and reflects the light coming from the collective lens. The collective lens is fixed at one end with respect to the direction of angular dispersion, expands with heat in a direction in which it is not fixed when the temperature rises, and outputs the light in a direction opposite to the direction in which the angle of light output from the spectroscopic element changes.

10 Claims, 11 Drawing Sheets

A PAIR OF DIFFRACTION GRATINGS

A PLURALITY OF DIFFRACTION GRATINGS

WAVELENGTH SELECTIVE SWITCH

CROSS-REFERENCE TO RELATED APPLICATIONS

This application is based upon and claims the benefits of priority from the prior Japanese Patent Application No. 2007-087605, filed on Mar. 29, 2007, the entire contents of which are incorporated herein by reference.

BACKGROUND OF THE INVENTION

1. Field of the Invention

The present invention relates to wavelength selective switches, and more specifically, to a wavelength selective switch for performing optical switching.

2. Description of the Related Art

Optical networks based on wavelength division multiplexing (WDM) have been rapidly increasing to serve surging Internet traffic.

Currently, WDM is used mainly in point-to-point networks and will be used in ring networks and mesh networks in the near future. Each node constructing the network will be able to add or drop any wavelength and perform processing such as optical cross connect (OXC), which does not include any optical-to-electronic conversion, and a path will be allocated and deallocated dynamically in accordance with wavelength information.

As a device for implementing these optical networks, a wavelength selective switch (WSS) that allows any wavelength to be switched in any direction has been receiving attention in recent years.

FIGS. 6 and 7 are conceptual drawings of the WSS. FIG. 6 is a top view of a WSS 5, illustrating angular dispersion of optical beams output from a spectroscopic element 51, and FIG. 7 is a side view of the WSS 5, illustrating port switching. The WSS 5 includes the spectroscopic element 51, a collective lens 52, a plurality of mirrors 53 arranged in the direction of angular dispersion of the optical beams output from the spectroscopic element 51, an input port 54, and output ports 55.

Multi-wavelength WDM light input from the input port 54 is separated by the spectroscopic element 51 and gathered by the collective lens 52 onto the mirrors 53 corresponding to different wavelengths. The inclination (angle) of each mirror 53 is changed to output the reflected light from a corresponding output port 55. The mirrors 53 are disposed in the direction in which the beams spread after angular dispersion depending on the wavelengths made by the spectroscopic element 51 and can be turned in a direction differing from the direction in which the beams have spread.

As the spectroscopic element 51, a diffraction grating is generally used. The diffraction grating is an optical element having a number of parallel grooves made at regular spacing on a glass substrate and performs wavelength separation by optical diffraction by giving a plurality of wavelength components input at a certain angle output angles depending on the wavelengths.

The mirrors 53 are generally a group of micro electromechanical system (MEMS) mirrors, and a single mirror is disposed for a single wavelength separated by the spectroscopic element 51. The angle of inclination of the MEMS mirror can be varied, and the inclination angle determines the output port corresponding to each wavelength component.

One measure of the performance of a WSS is pass band. FIG. 8 is a view showing the pass band of the WSS 5. The vertical axis of the graph represents the optical spectral value, and the horizontal axis represents the wavelength. The figure shows the pass band characteristics of the WSS 5 in its initial operation when the beams output from the collective lens 52 fall on desired positions (centers) of the mirrors 53.

The central wavelength of the channel to pass is placed in the central position of the bandwidth of the flat pass band, and the transmittance is optimized (if the pass-band bandwidth is 50 GHz and if the central wavelength of the channel to pass is placed in the central position, the channel has a pass band of 50 GHz).

The pass band of the WSS 5 increases as the width (area) of the mirrors 53 becomes greater than the diameters of the beams output from the collective lens 52 and as the deviation of the central wavelength decreases.

The pass band increases as the width of the mirrors increases, as the diameters of the beams on the mirror decrease, and as the beam of the central wavelength of the channel specified by the ITU-T grid is incident closer on the center of the mirror corresponding to the channel (an ITU-T recommendation on the grid specifies the spacing and wavelengths of multi-wavelength channels in WDM communication).

With a wide pass band (pass-band bandwidth), the upper limit of the bit rate that can be supported can be raised. Light with a high bit rate has a wide spectrum width, and the wide pass band can cover the wide spectrum width.

The wide pass band also allows a number of WSS stages to be connected to be increased because the accumulated amount of bandwidth deviations is small even if the WSSs are connected in multiple stages. With the wide pass band of the WSS, good transmission characteristics can be kept.

A conventional optical switching technique proposed in Japanese Unexamined Patent Application Publication No. 2005-283932 switches the channel for each single-wavelength light component included in WDM light and reduces the number of components by sharing a wavelength demultiplexing element provided in the spectroscopic system.

A requirement for attaining sufficient pass band characteristics with the WSS is that the beam of a wavelength corresponding to the ITU-T grid agrees with the center of the mirror corresponding to each ITU-T grid wavelength.

The components forming the WSS, however, have temperature characteristics. Even if initialization is performed to gather the beams onto the centers of the mirrors, a change in temperature in the operating environment or the like may cause the beams to deviate from the centers of the mirrors, decreasing the pass band.

FIG. 9 is a view showing that the light gathering positions of beams deviate when the temperature changes. The change in temperature changes the angles of beams output from the spectroscopic element 51. The figure shows that the light gathering positions have deviated downward from the centers of the mirrors 53.

A pass band characteristics graph shows that the central wavelength of the beam deviates to the right by a frequency of 10 GHz, for instance. This decreases the pass band of the channel from the initial value of 50 GHz to 40 GHz.

Factors for the change in pass band accompanying a change in temperature include (1) a change in angle or position of each beam depending on the linear expansion coefficients of fixture members which fix the diffraction grating, the collective lens, and the mirror and (2) a change in angle or position of each beam depending on the temperature characteristics (linear expansion coefficient, refractive index temperature coefficient) of the diffraction grating itself).

The factor (1) can be suppressed relatively easily to such a level that the effect on the pass band characteristics becomes small, by using a fixture member made of a material having a low linear expansion coefficient such as Invar.

FIG. 10 is a view showing a deviation in light gathering positions of beams. The shown deviation in light gathering positions of beams is caused by expansion of a fixture member 57 for fixing the collective lens 52. If the fixture member 57 is made of a material having a low linear expansion coefficient such as Invar, if the focal distance of the collective lens 52 is 200 mm, and if the beam output angle of the diffraction grating is 5° both at the shortest wavelength and at the longest wavelength, the deviation ΔX in light gathering positions of beams caused by expansion of the fixture member 57, if the fixture member 57 expands with heat, would be about 0.01 μm.

FIG. 11 is a view showing another deviation in light gathering positions of beams. The shown deviation in light gathering positions of beams is caused by expansion of a fixture member 56 which fixes the mirrors 53. If the fixture member 56 is made of a material having a low linear expansion coefficient such as Invar, if the center-to-center distance of the mirrors 53 is 10 mm, if the change ΔT in temperature is 80° C., the deviation ΔX in light gathering positions of beams caused by expansion of the fixture member 56 would be about 0.8 μm, because the linear expansion coefficient of Invar is about $1 \times 10^{-6}/°$ C.

A 5-μm deviation in light gathering positions of beams usually corresponds to a 1-GHz change in frequency, and the change of 1 GHz may be considered as degradation of the pass band characteristics. A deviation of up to 1 μm in light gathering positions of beams caused by expansion of the fixture members would not give a great effect on the pass band characteristics.

The factor (2) means that, even if expansion of a fixture member which fixes the diffraction grating does not have a great effect, the spacing between the grooves made in the diffraction grating itself changes by a change in temperature. This will change the angles of the output beams, giving a great influence on degradation of the pass band characteristics.

Even when the diffraction grating is made of quartz, which has a low linear expansion coefficient, the deviation in light gathering positions of beams is about 20 μm for a diffraction grating pitch of 1/1000 mm. If the diffraction grating pitch per channel is set to 500 μm, a 30-μm deviation in light gathering positions of beams corresponds to a 6-GHz decrease in band.

The temperature characteristics of the diffraction grating used as the spectroscopic element 51 have a greater influence on the deviation in light gathering positions of beams than other factors. Because the WSS may use a plurality of diffraction gratings or may use another element that has temperature characteristics, the total change in beam positions would be greater than the values indicated above.

Conventionally, the deviation in light gathering positions of beams caused by the temperature characteristics of a diffraction grating has been suppressed by selecting a diffraction grating made of a material having small temperature characteristics or by performing constant temperature control by means of a heater, a Peltier element, or the like to keep a constant temperature state.

The value of the diffraction grating pitch indicated above is obtained when quarts, which has a low linear expansion coefficient among general glass materials, is used. It is difficult to use a glass material having a lower linear expansion coefficient than quartz, because of the cost and optical characteristics such as transmittance. If a heater, a Peltier element, or the like is used to perform constant temperature control, the control system added for that purpose increases the power consumption.

SUMMARY OF THE INVENTION

In view of the foregoing, it is an object of the present invention to provide a wavelength selective switch that can effectively suppress the degradation of pass band characteristics caused when the temperature rises.

To accomplish the above object, according to the present invention, there is provided a wavelength selective switch. This wavelength selective switch includes a spectroscopic element for separating input light and providing angular dispersion depending on the wavelengths, a collective lens for gathering light output from the spectroscopic element, and a movable reflection block that includes a plurality of mirrors arranged in the direction of angular dispersion made by the spectroscopic element, changes the angles of the mirrors to a direction differing from the direction of angular dispersion, and reflects light from the collective lens. The collective lens is fixed at one end with respect to the direction of angular dispersion of the light output from the spectroscopic element.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
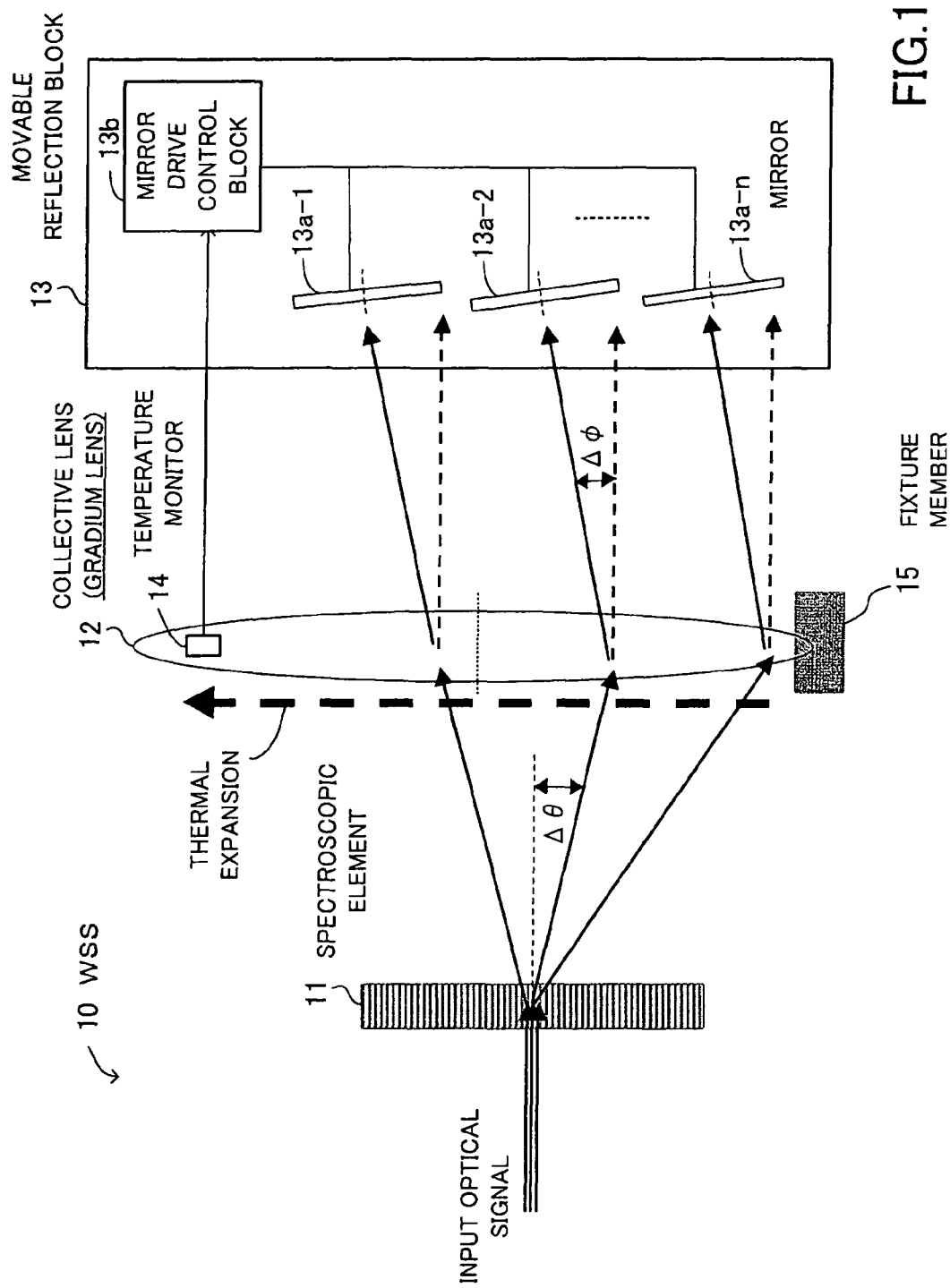
FIG. 1 is a view showing the principle of a wavelength selective switch (WSS).

An embodiment of the present invention will be described below with reference to the drawings. FIG. 1 is a view showing the principle of a wavelength selective switch 10. The wavelength selective switch (WSS) 10 includes a spectroscopic element 11, a collective lens 12, and a movable reflection block 13.

The collective lens 12 has a temperature monitor 14. An input port for inputting light into the spectroscopic element 11 or output ports for outputting light reflected from the movable reflection block 13 are not shown in the figure.

The spectroscopic element 11 separates the input light and provides angular dispersion depending on wavelengths. The collective lens 12 gathers light output from the spectroscopic element 11.

The movable reflection block 13 includes a plurality of mirrors 13a-1 to 13a-n arranged in the direction of angular dispersion by the spectroscopic element 11. The light subjected to angular dispersion depending on wavelengths by the spectroscopic element 11 spreads, and the spread light passes through the collective lens 12 and gathers onto the plurality of mirrors 13*a*-1 to 13*a*-*n* disposed for the corresponding wavelengths.

The mirrors 13*a*-1 to 13*a*-*n* are turned to a direction differing from the direction of angular dispersion (the mirrors 13*a*-1 to 13*a*-*n* can be turned to a direction differing from the direction in which the beam has spread) and reflect light coming from the collective lens 12.

In the WSS 10 described above, the collective lens 12 is fixed at one end with respect to the direction of angular dispersion of the light output from the spectroscopic element 11. Since the spectroscopic element 11 such as a diffraction grating has temperature characteristics, the angles of beams output from the spectroscopic element 11 change with a change in temperature (an increase in temperature). When the collective lens 12 is fixed at one end, it is fixed at an end in the direction in which the angles of the beams output from the spectroscopic element 11 change depending on the temperature characteristics.

In the figure, the beams output from the spectroscopic element 11 are turned downward by $\Delta\theta$ when the temperature changes by $\Delta T$. The collective lens 12 is fixed at its lower end by a fixture member 15 made of Invar or other materials.

The beams output from the spectroscopic element 11 do not change in random directions, up and down, depending on the change in temperature. The beams output from the spectroscopic element 11 change always in the same direction when the temperature changes. Accordingly, when the collective lens 12 is fixed at one end, the end to be fixed can be determined beforehand.

If the collective lens 12 is fixed at the end in the direction in which the angles of the beams output from the spectroscopic element 11 change depending on the temperature characteristics, the collective lens 12 expands with heat in the direction in which it is not fixed when the temperature changes.

The beams output from the spectroscopic element 11 are turned downward by $\Delta\theta$, but the beams output from the spectroscopic element 11 fall on the collective lens 12 which has been expanded with heat only in the upward direction. Therefore, the collective lens 12 outputs the beams in an upward direction (inclined upward by $\Delta\phi$ in the figure), which is opposite to the direction of deviation.

By fixing the collective lens 12 at one end in the direction in which the angles of the beams output from the spectroscopic element 11 deviates depending on the temperature characteristics, the beams are refracted in the direction opposite to the direction in which the angles of the beams output from the spectroscopic element 11 deviate. This corrects the deviation in light gathering positions of beams output from the spectroscopic element 11 depending on the temperature characteristics, on the mirrors.

When the temperature monitor 14 provided for the collective lens 12 detects a change in temperature, the detection result is reported to a mirror drive control block 13*b* in the movable reflection block 13. The mirror drive control block 13*b* has, in advance, data (table) indicating the correspondence between a change in temperature and a deviation in angles of beams output from the collective lens 12 and recognizes the deviation in angles of beams output from the collective lens 12 depending on the reported change in temperature.

In the shown example, it is recognized that the deviation in angles of beams output from the collective lens 12 is $\Delta\phi$ when the temperature changes by $\Delta T$. Then, the mirror drive control block 13*b* corrects the angles of the mirrors 13*a*-1 to 13*a*-*n* automatically to minimize the transmission loss of the beams output from the collective lens 12 having an angular deviation $\Delta\phi$ with respect to the change $\Delta T$ in temperature detected by the temperature monitor 14.

In initialization, the angles of the mirrors 13*a*-1 to 13*a*-*n* are specified to optimize the pass band characteristics with respect to the beams output from the collective lens 12 when no change has occurred in temperature. When the temperature changes by $\Delta T$, the angels of the mirrors 13*a*-1 to 13*a*-*n* are adjusted automatically to optimize the pass band characteristics with respect to the beams output from the collective lens 12 having an angular change of $\Delta\phi$ (the beams output from the collective lens 12 can be gathered onto the initial light gathering positions of the beams by turning the mirrors by $\Delta\phi$).

In the WSS 10 structured as described above, when the angles of the beams output from the spectroscopic element 11 change with a change in temperature, the collective lens 12 expands with heat in a direction in which it is not fixed and outputs the beams in the direction opposite to the direction in which the angles of the output beams of the spectroscopic element 11 have changed. The movable reflection block 13 turns the mirrors 13*a*-1 to 13*a*-*n*, following the beams output from the collective lens 12, to correct the deviation in light gathering positions of beams caused by the temperature characteristics of the spectroscopic element 11.

This eliminates the need for providing a constant temperature control mechanism such as a Peltier element or a heater and effectively suppresses the degradation of the pass band characteristics owing to the change in temperature, allowing optical switching processing to be performed with high precision and high reliability.

Optical design parameters of the components of the WSS 10 will be described next. The spectroscopic element 11 will be described as a diffraction grating 11*a*, and the mirrors 13*a*-1 to 13*a*-*n* may be collectively referred to as a mirror 13*a*.

Figure 2:
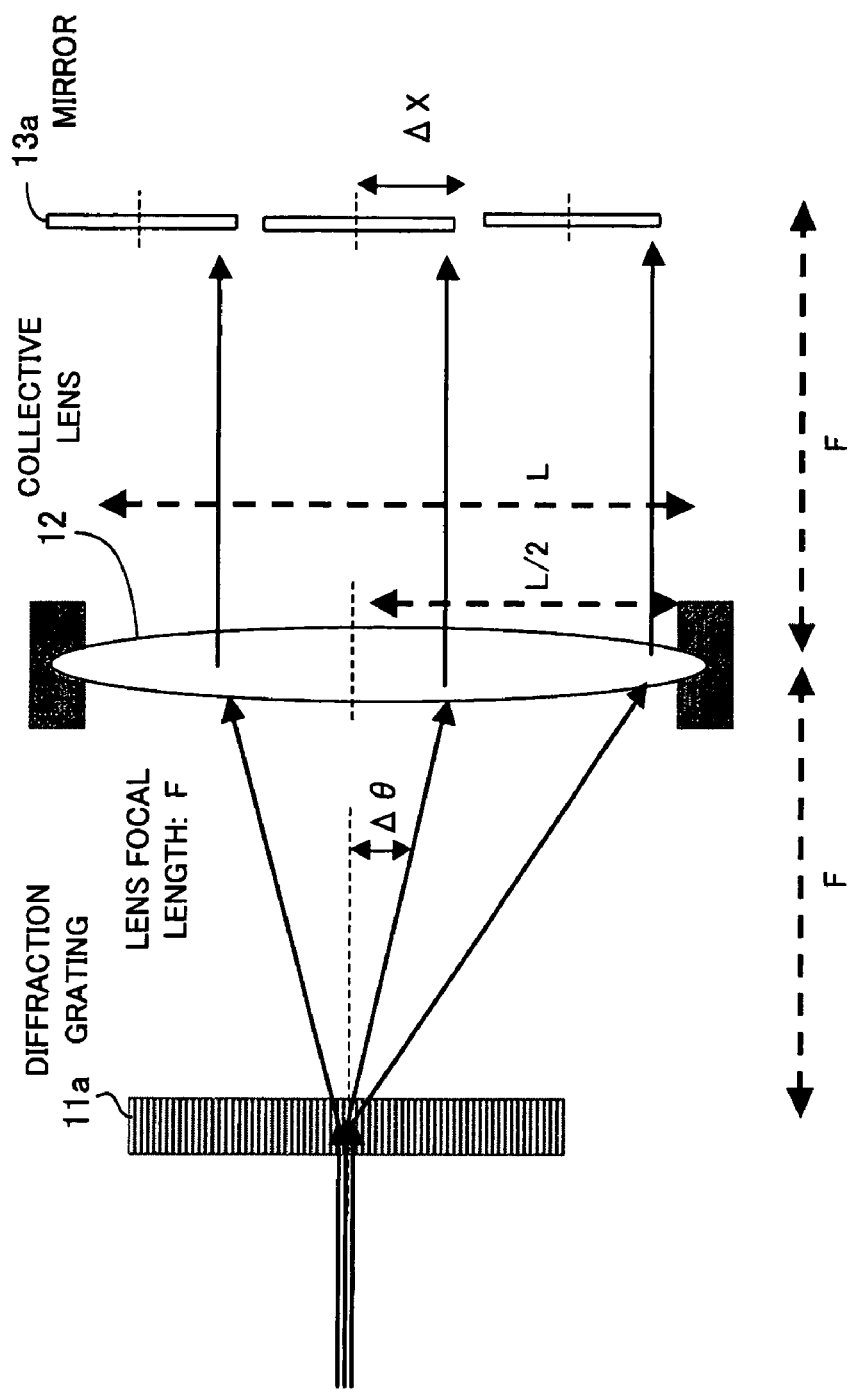
FIG. 2 is a view showing a deviation in light gathering positions of beams when a collective lens is fixed at both ends.

FIG. 2 is a view showing a deviation in light gathering positions of beams when the collective lens 12 is fixed at both ends. In the figure, the focal length of the collective lens 12 is F, and the distance between the diffraction grating 11*a* and the collective lens 12 and the distance between the collective lens 12 and the mirror 13*a* are also F. It is assumed that the collective lens 12 has no aberration.

If the angles of the beams output from the diffraction grating 11*a* change by $d\theta/dT$ when the temperature changes by 1° C., a change $\Delta\theta$ in angles of output beams accompanying a change $\Delta T$ in temperature is given by the expression below:

$$\Delta\theta = \Delta T \times d\theta/dT \quad (1)$$

If the collective lens 12 is fixed at both ends in the direction of angular dispersion of the beams output from the diffraction grating 11*a*, the collective lens 12 cannot expand with heat in either direction, not changing the angles of the output beams under a change in temperature. The difference $\Delta X$ between the center of the mirror 13*a* and the light gathering position of each beam can be expressed by using $\Delta\theta$, as given by Equation (2) below. This $\Delta X$ leads to the degradation of the pass band characteristics.

$$\Delta X = F \times \tan(\Delta\theta) \quad (2)$$

Figure 3:
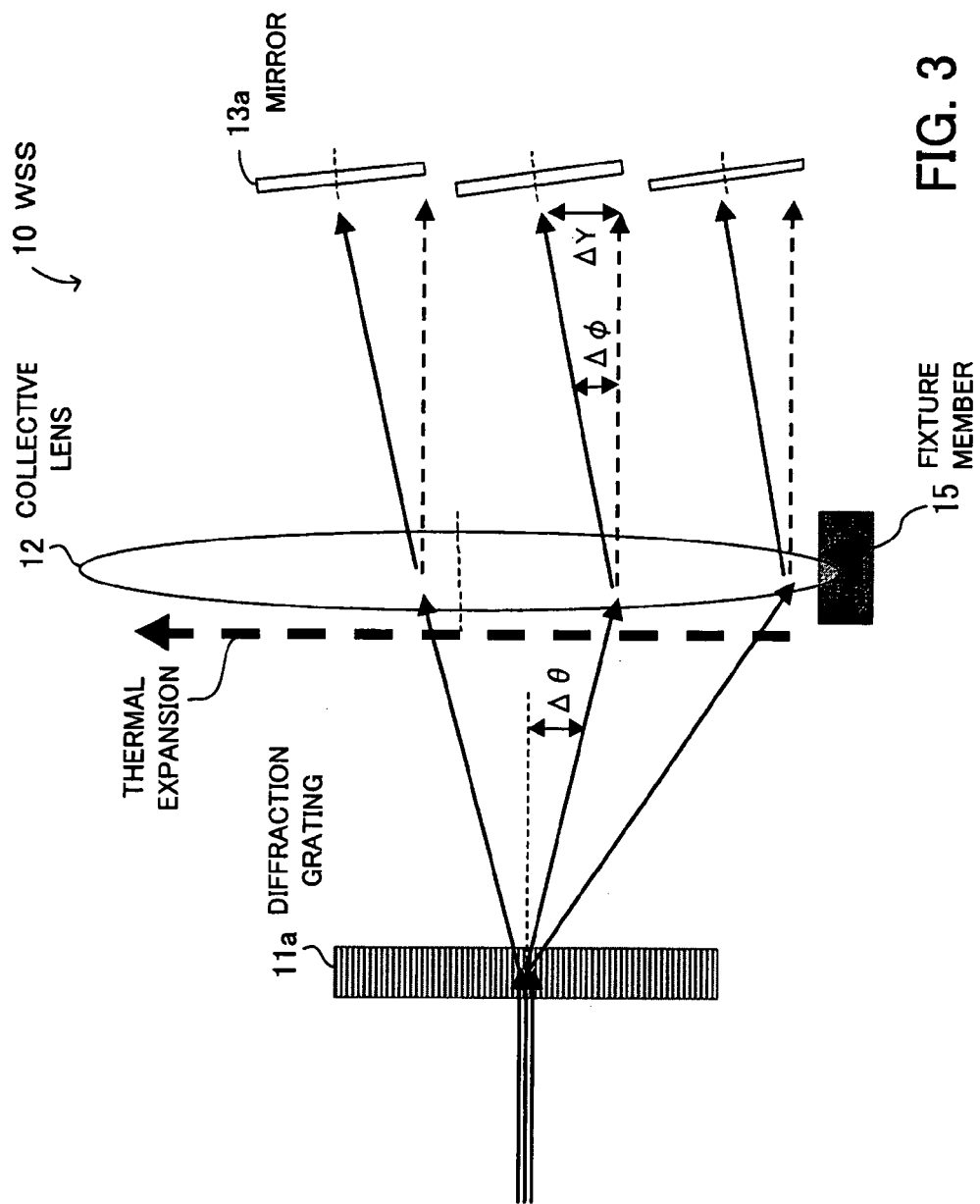
FIG. 3 is a view showing a deviation in light gathering positions of beams when the collective lens is fixed at one end.

FIG. 3 is a view showing a deviation in light gathering positions of beams when the collective lens 12 is fixed at one end. The figure shows the structure of the WSS 10 and shows that the collective lens 12 is fixed by the fixture member 15 at the end in the direction in which the angles of the beams output from the diffraction grating 11*a* change in accordance with the temperature characteristics.

The collective lens 12 expands with heat in a direction in which it is not fixed, unlike when it is fixed at both ends. The thermal expansion of the collective lens 12 changes the angles of the beams output from the collective lens 12 in the direction of thermal direction of the collective lens 12, causing the output beams to be turned in a direction opposite to the direction in which the light gathering positions of the beams have deviated in accordance with the temperature characteristics of the diffraction grating 11a. Consequently, the deviation in light gathering positions of beams in accordance with the temperature characteristics of the diffraction grating 11a can be corrected.

If it is assumed that a change in focal length owing to the thermal expansion of the collective lens 12 and changes in the distance between the diffraction grating 11a and the collective lens 12a and in the distance between the collective lens 12 and the mirror 13a owing to the thermal expansion of the fixture member 15 are negligible, the amount of expansion of the center position of the collective lens 12 is $\Delta T \times \alpha \times L/2$, where $\alpha$ is the linear expansion coefficient of the collective lens 12 and L/2 is the distance between the fixed end of the collective lens 12 and the center of curvature (if the lens is symmetrical on both sides of the center of curvature, the length of the lens is L). Accordingly, a change $\Delta\theta$ in angles of beams output from the collective lens 12 accompanying a change $\Delta T$ in temperature is given by Equation (3) below.

$$\Delta\phi = \arctan((\Delta T \times \alpha \times L)/(2 \times F)) \quad (3)$$

The amount of displacement $\Delta Y$ of the beam on the mirror 13a caused by $\Delta\phi$ can be expressed by Equation (4) below (same as the amount of expansion of the center position of the collective lens 12).

$$\Delta Y = F \times \tan(\Delta\phi) = \Delta T \times \alpha \times L/2 \quad (4)$$

If $\Delta Y$ is too large, the beam output from the collective lens 12 comes off the mirror 13a and does not gather onto the mirror 13a. The following condition must be satisfied to gather the beam output from the collective lens 12 onto the mirror 13a (or to cause the beam to fall on the mirror 13a).

$$0 < \Delta Y < 2 \times \Delta X \quad (5)$$

Because the change in angle is very small, Equation (5) can be converted to Equation (6) by using an approximate expression of $\tan(\theta)=\theta$ and Equations (1), (2), and (4).

$$0 < \alpha \times L < 4 \times F \times d\theta/dT \quad (6)$$

Accordingly, to gather the beam output from the collective lens 12 having an angular change $\Delta\phi$ of beam onto the mirror 13a, the focal length F, the linear expansion coefficient $\alpha$, and the distance L/2 between the fixed end of the collective lens 12 and the center of curvature should be specified to satisfy the condition of Equation (6) with respect to the change $d\theta/dT$ in angle of beam output from the diffraction grating 11a.

The beam output from the collective lens 12 having an angular change $\Delta\phi$ of beam gathers onto the center position of the mirror 13a (the light gathering position of the beam where the initial pass band characteristics are optimized) if the condition of Equation (7) below is satisfied.

$$\Delta Y = \Delta X \quad (7)$$

Because the change in angle is very small, Equation (7) can be converted to Equation (8) by using an approximate expression of $\tan(\theta)=\theta$ and Equations (1), (2), and (4).

$$\alpha \times L = 2 \times F \times d\theta/dT \quad (8)$$

Accordingly, to cause the beam output from the collective lens 12 having an angular change $\Delta\phi$ of beam to fall onto the center position of the mirror 13a, the focal length F, the linear expansion coefficient $\alpha$, and the distance L/2 between the fixed end of the collective lens 12 and the center of curvature should be specified to satisfy the condition of Equation (8) with respect to the change $d\theta/dT$ in angle of beam output from the diffraction grating 11a.

Figure 4:
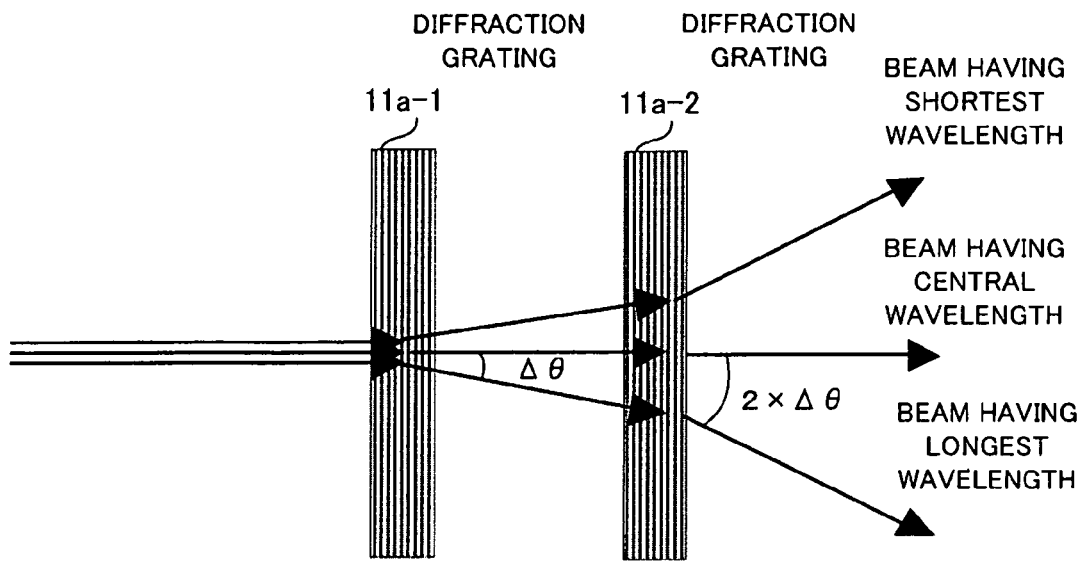
FIG. 4 is a view showing a pair of diffraction gratings.
Figure 4:
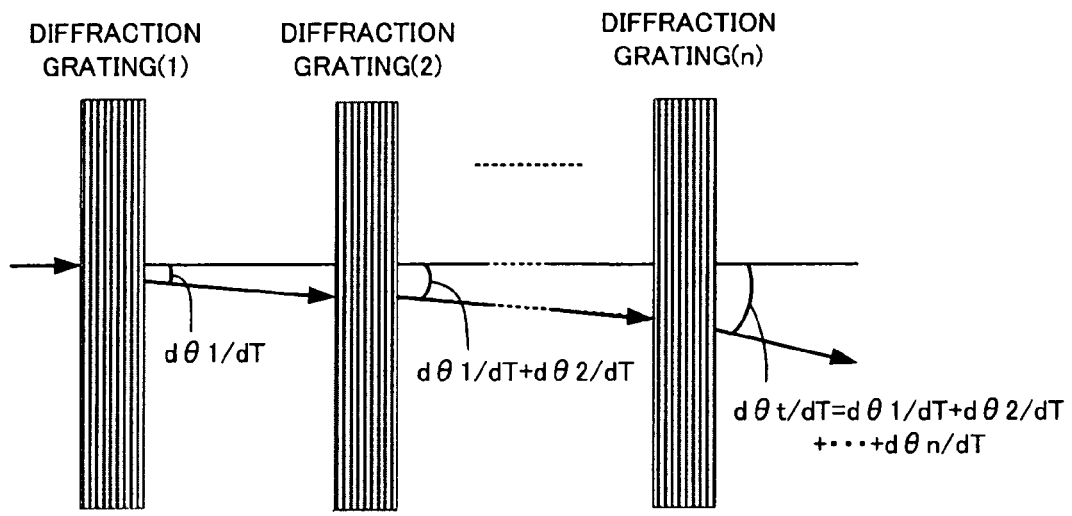

Modified structures of the WSS 10 will be described next. FIG. 4 is a view showing a pair of diffraction gratings. The spectroscopic element 11 includes two diffraction gratings 11a-1 and 11a-2.

Wavelength dispersion by a single diffraction grating provides beams having different wavelengths at narrow spacing, and it is difficult to arrange the MEMS mirrors of the corresponding wavelengths mechanically at the corresponding narrow spacing. With the pair of diffraction gratings, the wavelength dispersion capability doubles, and the mirror pitch can be widened.

Although this doubles the change in angles of beams output from the diffraction gratings 11a-1 and 11a-2 depending on the temperature characteristics (a change in angles of beams output from the diffraction grating 11a-1 is $\Delta\theta$, and a change in angles of beams output from the diffraction grating 11a-2 is $2\times\Delta\theta$), the spectroscopic element, including the pair of diffraction gratings, can effectively suppress the degradation of the pass band characteristics owing to a change in temperature by performing light gathering position deviation compensation control for the beams as described earlier with reference to FIGS. 1 to 3. The structure described above uses a pair of diffraction gratings, but light gathering position deviation compensation control for the beams, which has been described with reference to FIGS. 1 to 3, can also be applied when more than two diffraction gratings are used in multiple stages.

Figure 5:
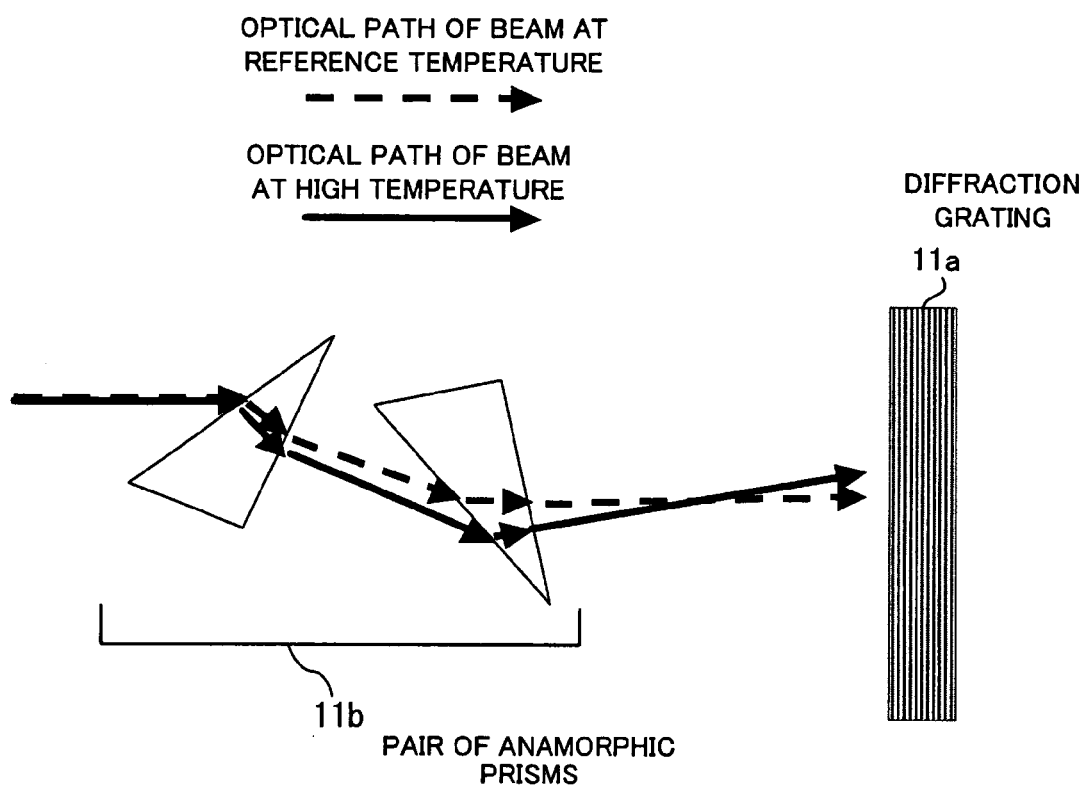
FIG. 5 is a view showing a pair of anamorphic prisms.
Figure 6:
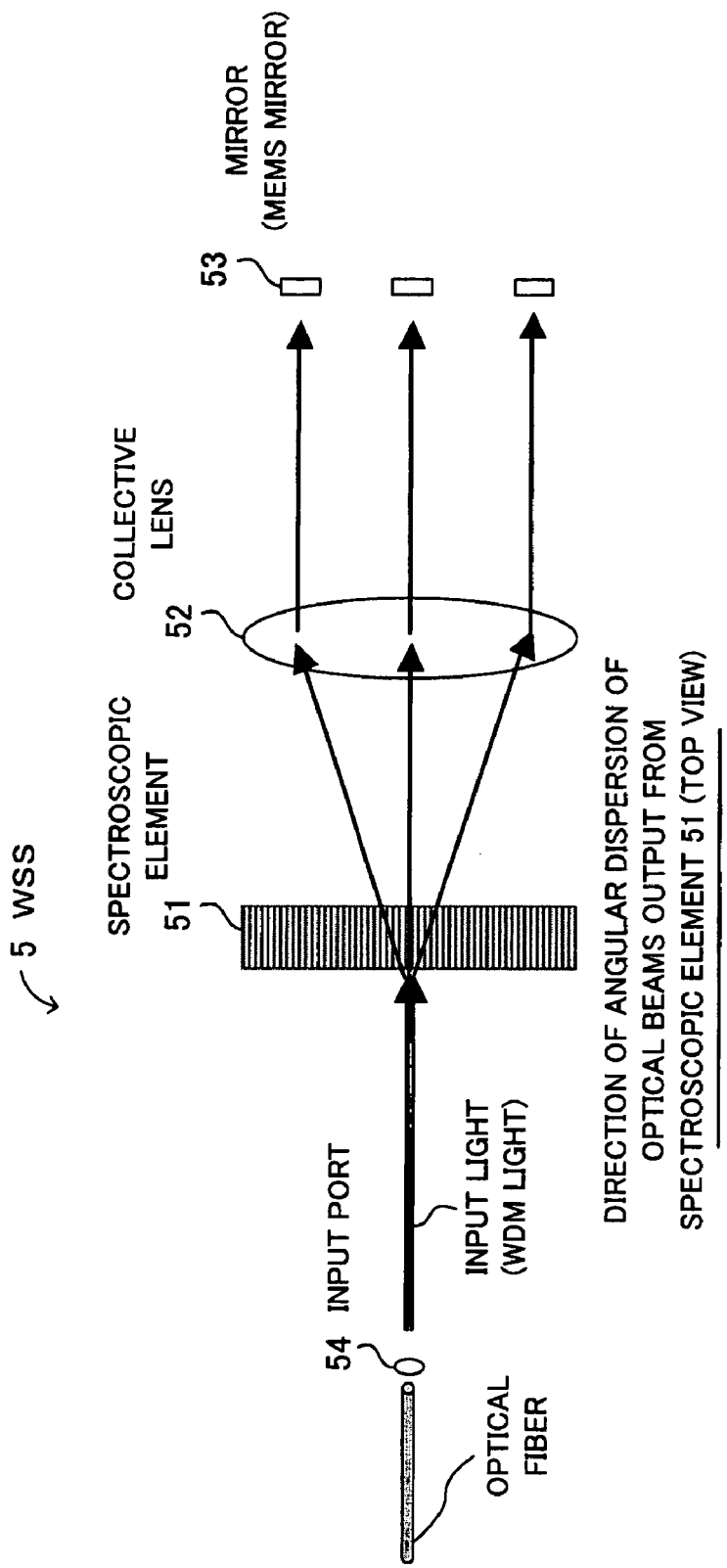
FIG. 6 is a conceptual drawing of the WSS.
Figure 7:
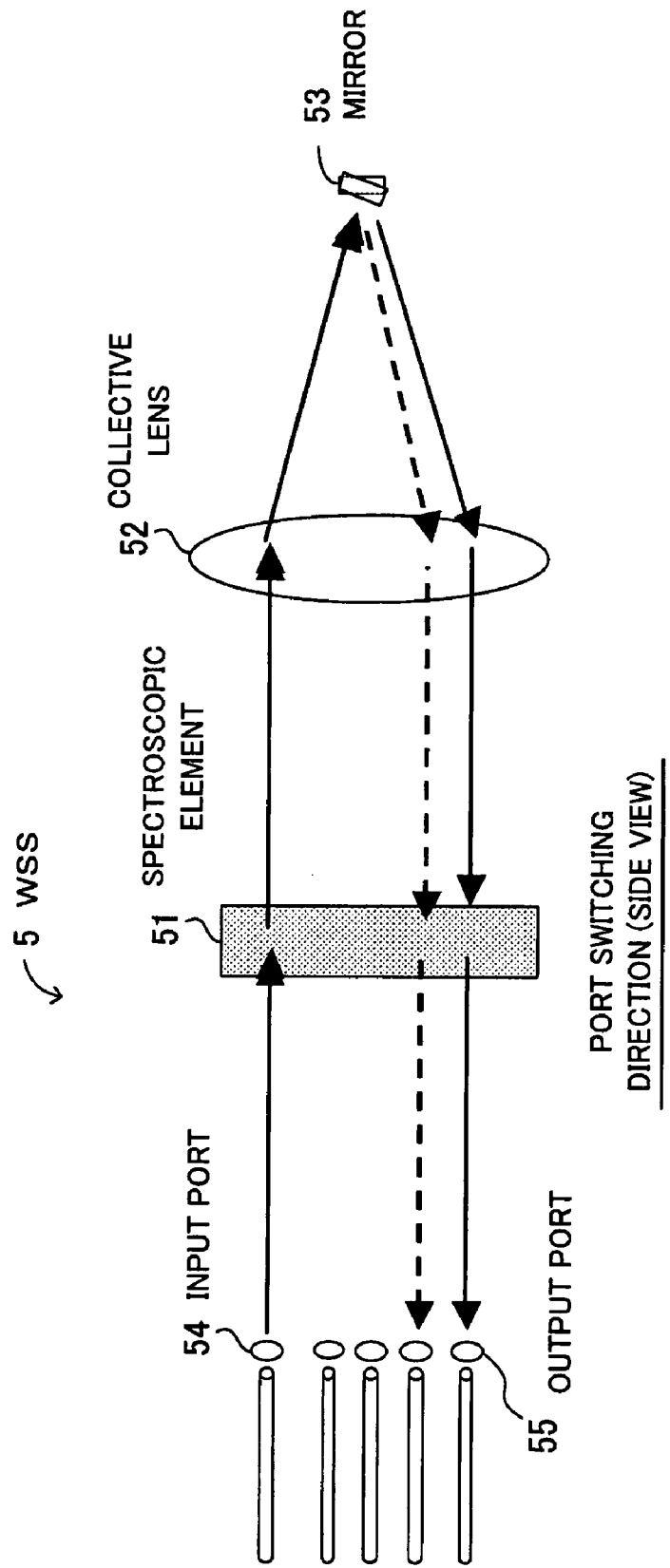
FIG. 7 is another conceptual drawing of the WSS.
Figure 8:
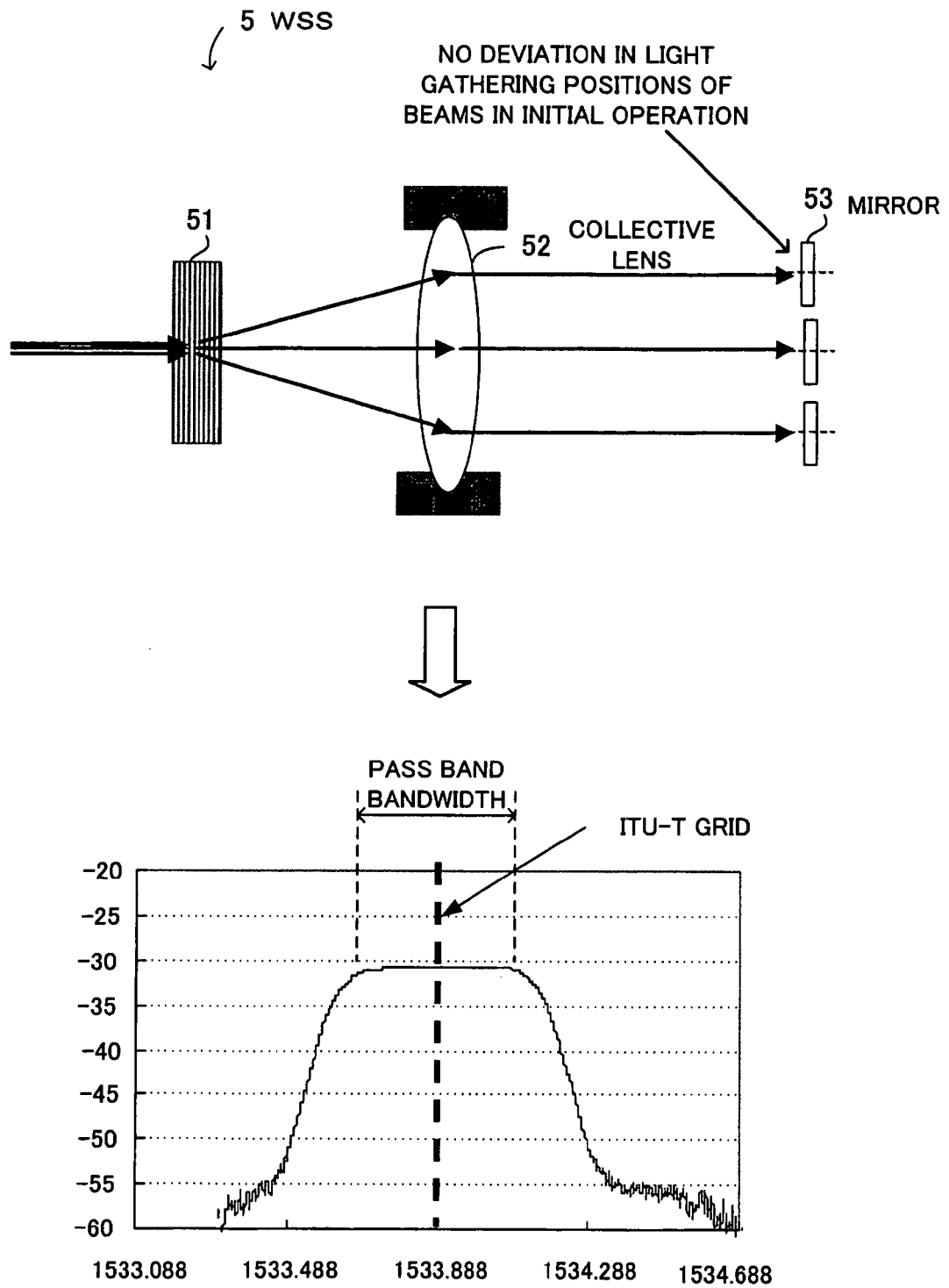
FIG. 8 is a view showing the pass band of the WSS.
Figure 9:
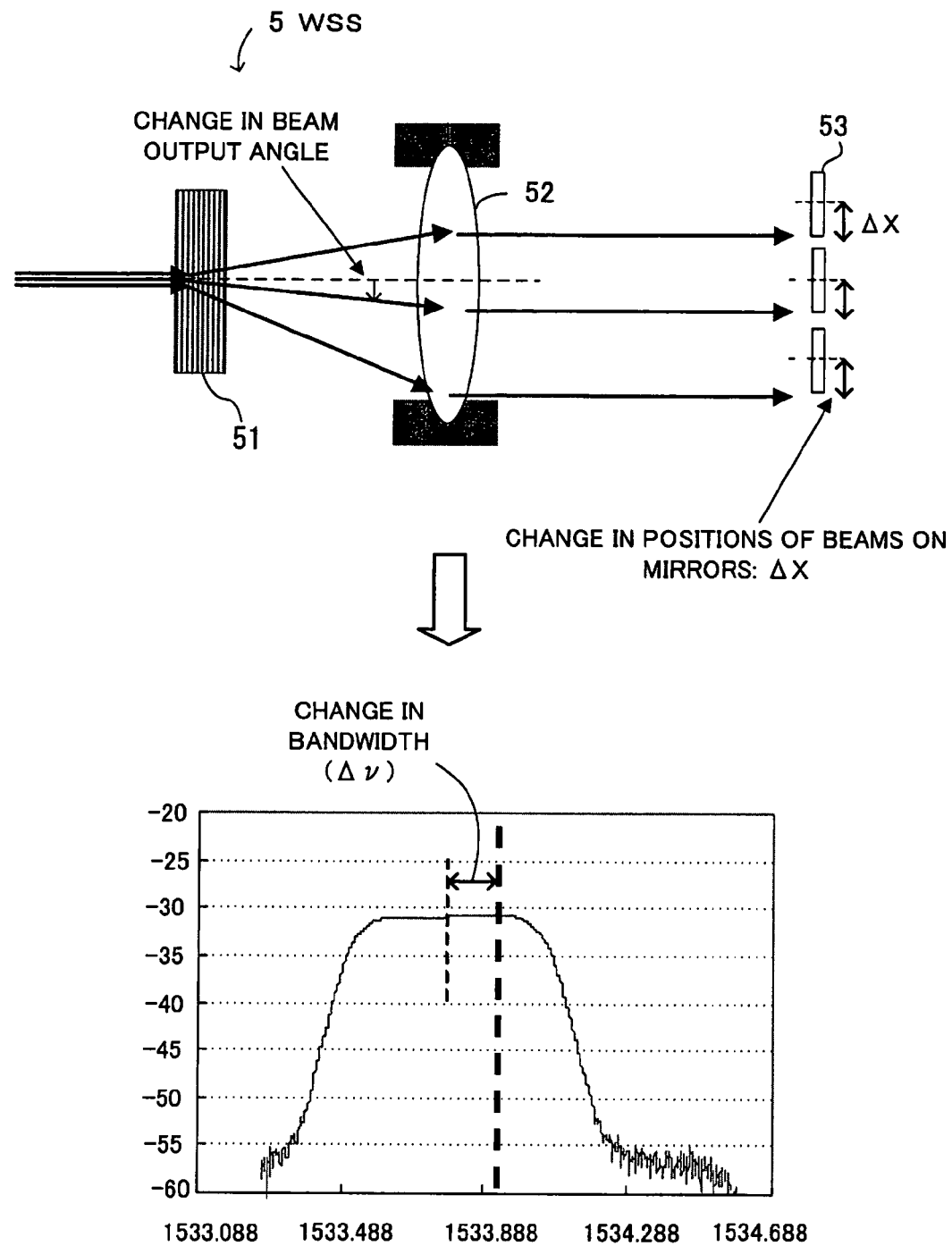
FIG. 9 is a view showing that the light gathering positions of the beams vary with a change in temperature.
Figure 10:
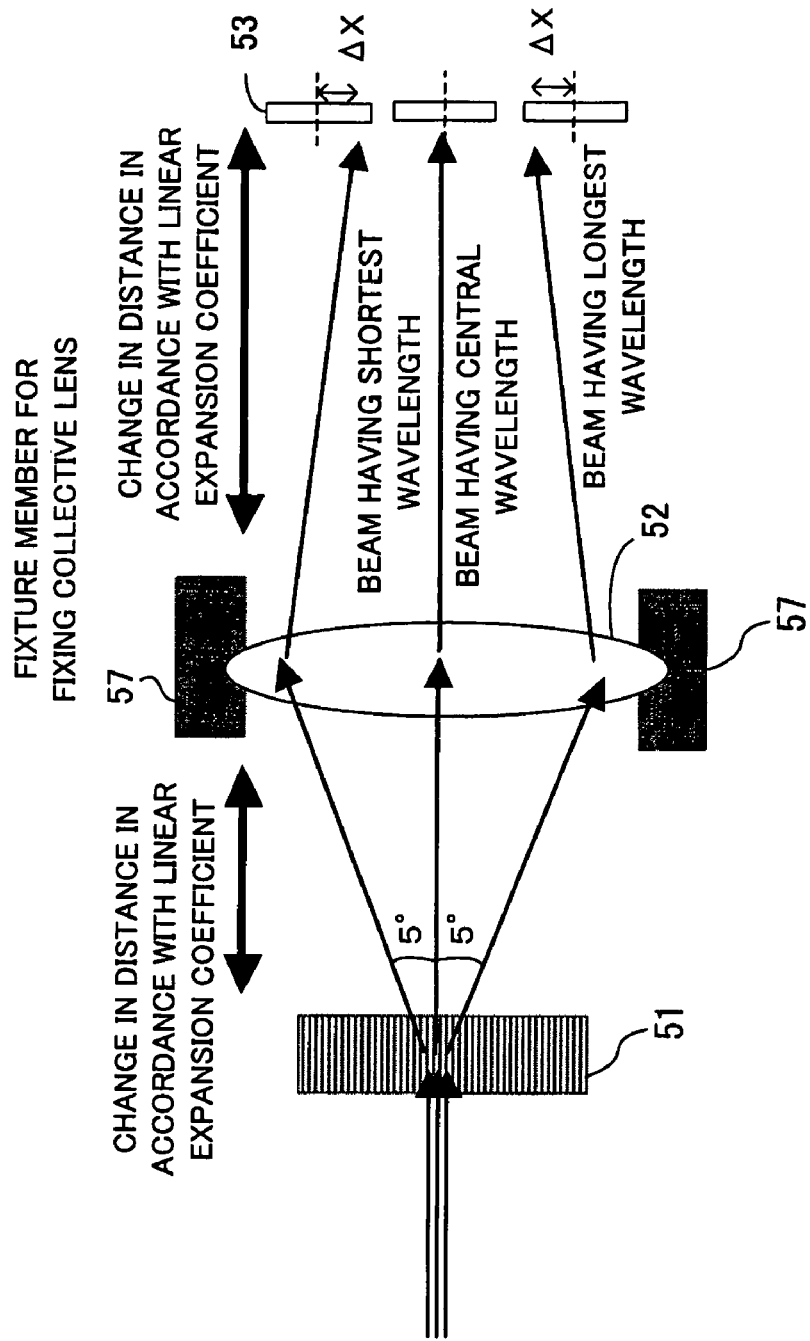
FIG. 10 is a view showing a deviation in light gathering positions of beams.
Figure 11:
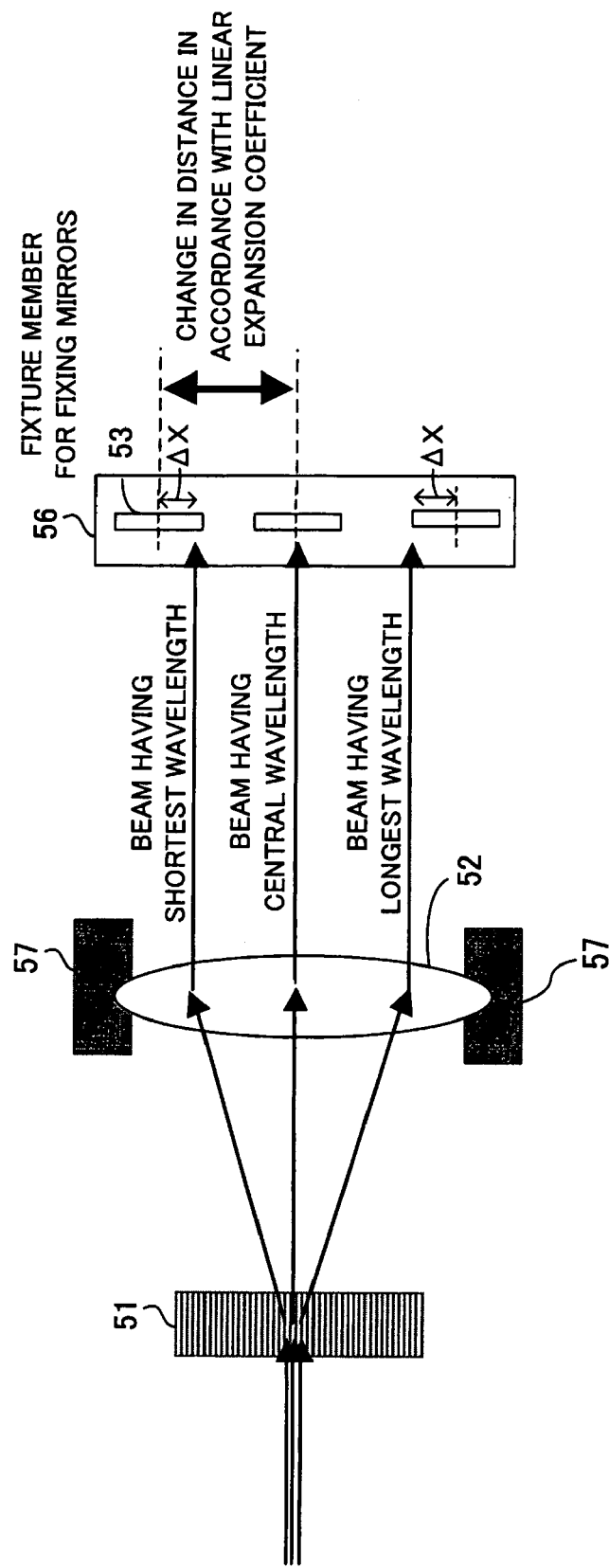
FIG. 11 is a view showing another deviation in light gathering positions of beams.

FIG. 5 is a view showing a pair of anamorphic prisms 11b. The spectroscopic element 11 includes an optical magnification system, such as the pair of anamorphic prisms 11b, and a diffraction grating 11a.

The optical magnification system magnifies the diameter of the beam output from the input port in the direction of angular dispersion of the optical beam output from the diffraction grating 11a. One representative optical magnification system is a pair of anamorphic prisms. When the pair of anamorphic prisms 11b are going to magnify the diameter of the beam just in the direction of angular dispersion of the optical beam output from the diffraction grating 11a, a thermal refractive-index change in the material of the prisms changes the angle of beam output. However, by performing light gathering position deviation compensation control for beams, as described earlier with reference to FIGS. 1 to 3, the temperature characteristics of the optical system such as the pair of anamorphic prisms 11b can be effectively corrected.

According to the present invention, the degradation of pass band characteristics owing to a change in temperature can be suppressed effectively, even when the spectroscopic element 11 includes the pair of anamorphic prisms 11b and the diffraction grating 11a.

A case will be described next where the spectroscopic element 11 includes a plurality of spectroscopic devices arranged between the optical input-output system (input-output port) and the collective lens 12. If the spectroscopic element 11 includes n diffraction gratings and if the change in angles of beams output per degree of each diffraction grating is denoted $d\theta1/dT, d\theta2/dT, \ldots d\theta n/dT, d\theta t/dT$ that can be expressed by the following equation is obtained.

$$d\theta t/dT = d\theta1/dT + d\theta2/dT + \ldots + d\theta n/dT \quad (9)$$

Then, the focal length F, the linear expansion coefficient $\alpha$, the distance L/2 between the fixed end of the collective lens 12 and the center of curvature are specified to satisfy the condition expressed by Equation (6) or (8) with respect to the direction of the angular change dθt/dT. This makes it possible to effectively suppress the degradation of the pass band characteristics owing to a change in temperature even if a plurality of spectroscopic elements are disposed.

The collective lens 12 will be described next. In the WSS 10, to suppress variations in beam position on the MEMS mirror 13a of the beam coming from each port, it is preferred that the collective lens 12 have a small spherical aberration. Accordingly, use of a Gradium lens is recommended.

The Gradium lens is a single lens having a spherical aberration corrected without aspheric surfacing. Because the linear expansion coefficient is about $9 \times 10^{-6}/°$ C., which is large among glass materials, the lens is small and the cost is reduced.

A wavelength selective switch according to the present invention includes a spectroscopic element, a collective lens, and a movable reflection block which changes the angle of a mirror to a direction differing from the direction of angular dispersion and reflects light from the collective lens, and the collective lens is fixed at one end with respect to the direction of angular dispersion of the optical beams output from the spectroscopic element. If the angles of beams output from the spectroscopic element change when the temperature increases, the collective lens expands with heat in a direction in which it is not fixed and outputs the beams in a direction opposite to the direction in which the angles of beams output from the spectroscopic element change. This corrects the deviation in light gathering positions of beams, and the degradation of the pass band characteristics can be suppressed.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wavelength selective switch, comprising:
   a spectroscopic element to separate input light and providing angular dispersion depending on wavelengths;
   a collective lens to gather light output from the spectroscopic element;
   a fixture member to fix one end of the collective lens; and
   a movable reflection block which comprises a plurality of mirrors arranged in a direction of the angular dispersion made by the spectroscopic element, changes the angles of the mirrors in a direction differing from the direction of angular dispersion, and reflects light output from the collective lens;
   wherein the collective lens is fixed at one end by the fixture member with respect to the direction of angular dispersion of the light output from the spectroscopic element,
   wherein the collective lens is fixed at an end in a direction in which the angle of the light output from the spectroscopic element changes in accordance with the spectroscopic element's temperature characteristics when the temperature rises, and
   wherein the collective lens expands with heat in a direction in which the collective lens is not fixed when the temperature changes, and the angle of the light output from the collective lens is changed in a direction opposite to the direction in which the angle of the light output from the spectroscopic element changes so as to correct a deviation in light gathering positions on the mirrors, of the light output from the spectroscopic element, depending on the temperature characteristics.

2. The wavelength selective switch according to claim 1, wherein the movable reflection block gathers the light output from the collective lens, onto the mirrors, if an angular change $\Delta\phi$ in angle of the light output from the collective lens is expressed by the following expression when the temperature changes by $\Delta T$, $$\Delta\phi = \arctan((\Delta T \times \alpha \times L)/(2 \times F))$$

where F is the focal length of the collective lens, α is the linear expansion coefficient of the collective lens, and L/2 is the distance between the fixed end of the collective lens and the center of curvature of the collective lens.

3. The wavelength selective switch according to claim 2, further comprising a temperature monitor;
   wherein the movable reflection block controls angle settings of the mirrors automatically to minimize transmission loss of the light output from the collective lens, having the angular change $\Delta\phi$ for the change $\Delta T$ in temperature detected by the temperature monitor.

4. The wavelength selective switch according to claim 1, wherein the focal length of the collective lens, the linear expansion coefficient of the collective lens, and the distance between the fixed end of the collective lens and the center of the curvature of the collective lens are specified to satisfy a condition expressed as $$0 < \alpha \times L < 4 \times F \times d\theta/dT$$

to make the light output from the collective lens, having an angular change $\Delta\phi$ in angle of the light, gather onto the mirrors, where F is the focal length of the collective lens, α is the linear expansion coefficient of the collective lens, L/2 is the distance between the fixed end of the collective lens and the center of curvature, and dθ/dT is a change in angle of output light with respect to the change in temperature of the spectroscopic element.

5. The wavelength selective switch according to claim 4, wherein the spectroscopic element comprises a plurality of spectroscopic devices, and the focal length, the linear expansion coefficient, and the distance between the fixed end of the collective lens and the center of curvature are specified to satisfy a condition with respect to the direction in which the angle changes by dθt/dT expressed as $$d\theta t/dT = d\theta 1/dT + d\theta 2/dT + \ldots + d\theta n/dT$$

where dθ1/dT, dθ2/dT, ..., and dθn/dT (dθi/dT, i=1, 2, ..., n) are angular changes in angle of output light with respect to changes in temperature of the spectroscopic devices.

6. The wavelength selective switch according to claim 1, wherein the focal length of the collective lens, the linear expansion coefficient of the collective lens, and the distance between the fixed end of the collective lens and the center of curvature of the collective lens are specified to satisfy a condition expressed as $$\alpha \times L = 2 \times F \times d\theta/dT$$

to make the light output from the collective lens, having an angular change $\Delta\phi$ in angle of the light, gather onto a center position of the mirror, where F is the focal length of the collective lens, α is the linear expansion coefficient of the collective lens, L/2 is the distance between the fixed end of the collective lens and the center of curvature, and dθ/dT is the change in angle of output light with respect to the change in temperature of the spectroscopic element.

7. The wavelength selective switch according to claim 6, wherein the spectroscopic element comprises a plurality of spectroscopic devices, and the focal length, the linear expansion coefficient, and the distance between the fixed end of the collective lens and the center of curvature are specified to satisfy a condition with respect to the direction in which the angle changes by $d\theta t/dT$ expressed as $$d\theta t/dT = d\theta 1/dT + d\theta 2/dT + \ldots + d\theta n/dT$$

where $d\theta 1/dT$, $d\theta 2/dT$, ..., and $d\theta n/dT$ ($d\theta i/dT$, $i=1, 2, \ldots, n$) are angular changes in angle of output light with respect to changes in temperature of the spectroscopic devices.

8. The wavelength selective switch according to claim 1, wherein a Gradium lens having a small spherical aberration is used as the collective lens.

9. The wavelength selective switch according to claim 1, wherein the spectroscopic element includes a first diffraction grating and a second diffraction grating, the first diffraction grating separates the input light and outputs a first light, the second diffraction grating separates the first light and makes the output light of which an angle is wider than an angle of the first light to allow a large mirror pitch.

10. The wavelength selective switch according to claim 1, wherein the spectroscopic element comprises a pair of anamorphic prisms of an optical magnification system and a diffraction grating disposed after the pair of anamorphic prisms.

* * * * *